May 26, 1953  R. W. DEAN  2,639,796
MACHINE CONTROL MEANS
Filed March 17, 1950
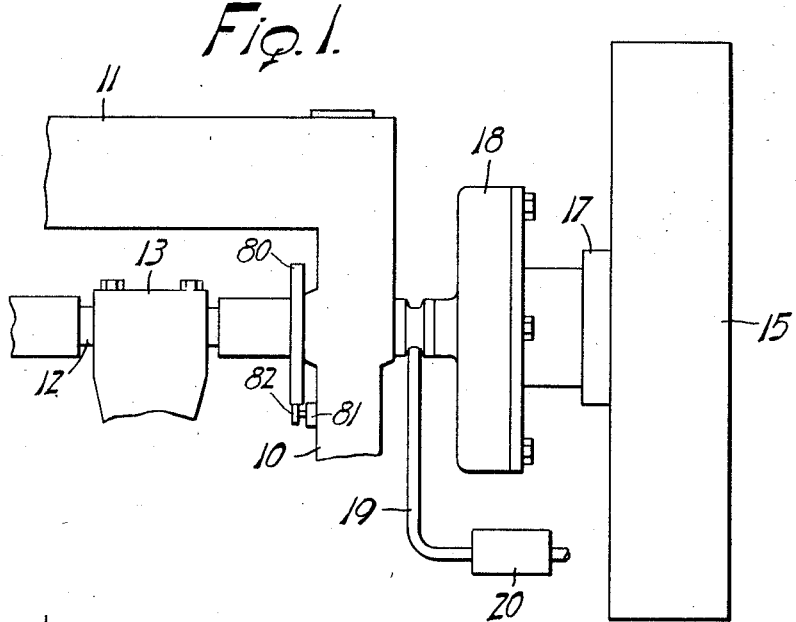
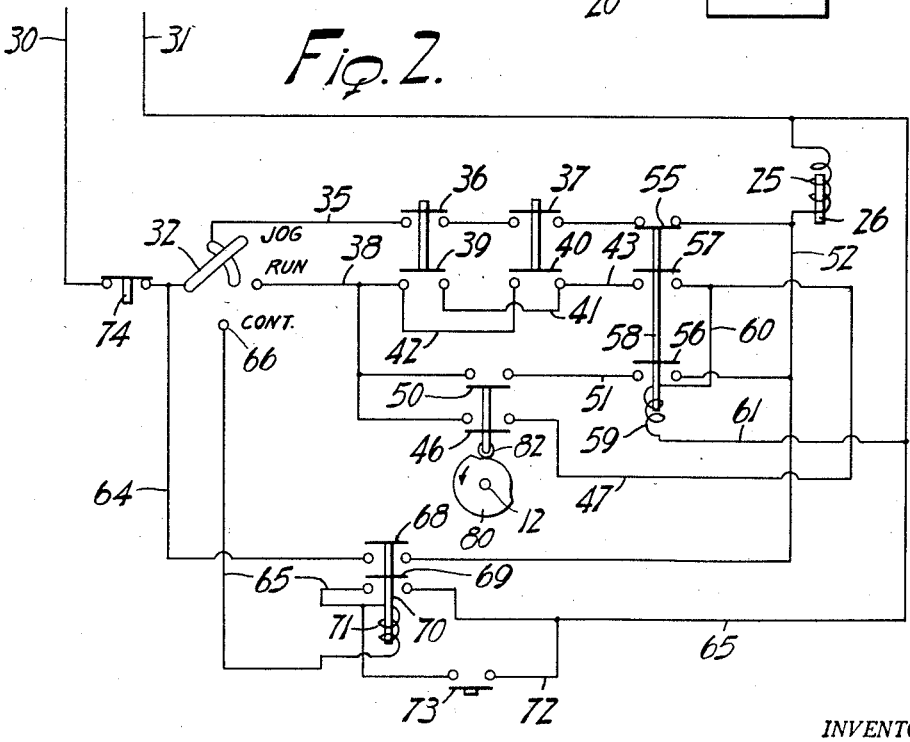
INVENTOR.
Reeve W. Dean
BY
Bean, Brooks, Buckley & Bean
ATTORNEYS Patented May 26, 1953

2,639,796

UNITED STATES PATENT OFFICE 2,639,796

MACHINE CONTROL MEANS

Reeve W. Dean, East Aurora, N. Y., assignor to Niagara Machine & Tool Works, Buffalo, N. Y.

Application March 17, 1950, Serial No. 150,247

5 Claims. (Cl. 192—131)

This invention relates to control means for punch presses, press brakes, power shears, and analogous machines.

The present invention sets forth a novel drive control arrangement which combines full flexibility of control with maximum safety. At the present time most machines of the kind under consideration here are provided with positive type, single-revolution clutches. In general, the machines of this class are set for a cycle of operation by pulling a clutch pin which results in the drive shaft of the machine being connected with a constantly rotating flywheel shaft or the like, and the clutch is automatically cammed out of engagement at the end of a single cycle of operation. Once the clutch pin is pulled, or once the clutch is engaged by similar mechanical means, the machine continues to the end of a punching, shearing or analogous working cycle of operation, beyond the control of the operator.

In this type of operation it is difficult, if not impossible, to introduce means for permitting the press to execute power-driven fractional cycles, to "inch" or "jog" the machine, as is desirable in setting up punches, dies, feeding devices, or other mechanism in a punch press. Furthermore, in most machines of the prior art, following the foregoing general arrangement, if an operator, immediately after starting a working cycle, discovers that the work is improperly positioned, that there are two blanks in a die instead of one, or any other abnormality, he can do nothing about it.

The present invention provides a single, relatively simple control system whereby the machine is under more complete control of the operator without in any way relaxing the precautions which must be made to prevent the operator from indulging in hazardous or undesirable practices.

In general, the arrangement of the present invention is such that an authorized person, as for instance a foreman or other supervisor may set the controls for free operation in any desired manner, as for setting up, repair, or the like; or he may set the controls in such a way that the operator can only operate the machine in a prescribed limited manner. The electric control circuit arrangement of the present invention is such that the machine may be conditioned for a particular type of operation and, when set for normal running by a punch press operator, as distinguished from supervisory personnel or set-up men, requires what is known in the art as two-hand control.

In providing control means for punch presses, metal shears, and similar machines, it is frequently desired to place a pair of push buttons in such relative positions that the operator must use both hands to press both buttons to institute a cycle of operation. This is done for the obvious reason of insuring that both of the operator's hands are on the buttons and not in a dangerous or unsafe position. It has been found that operators, heedless of the safety provisions so made, tape down or "stake" one of the buttons in order to speed up or simplify their work.

The advantages of simplicity and security of operation inherent in the present novel circuit arrangement will be obvious to those skilled in the art from a perusal of the ensuing specification in conjunction with the accompanying drawing. While a particular adaptation is shown in detail herein by way of example, it is to be understood that the electrical control of the invention may be applied with like benefit to any kind of clutch or clutch tripping arrangement or, in fact, to any other machine controlling devices susceptible of control in an analogous manner. The principles of the present invention are not to be considered as limited in spirit or scope, otherwise than as defined in the appended claims.

In the embodiment shown herein by way of example, the control system of the present invention is shown in combination with a fluid pressure operated positive type jaw clutch and, more particularly, with a clutch of that type which has combined therewith a brake for the drive shaft, the clutch and brake being alternatively effective to drive or brake the drive shaft and having common air operated means for applying the clutch and releasing the brake. The clutch and brake mechanism is shown herein merely in outline, and a suitable clutch and brake mechanism of this kind is illustrated and described in detail in United States Letters Patent to Frederick E. Munschauer, No. 2,428,337, dated September 30, 1947.

In this arrangement the clutch is biased to disengaged position, and the brake is biased to engaged position. The clutch is engaged and the brake disengaged by application of air pressure, and the parts return automatically to the idle position by mere cessation of the air pressure influence under the control of a conventional solenoid valve. In the alternative, the construction may be such that a four-way solenoid valve may be used for reversing the air pressure connections to move the clutch and brake operating means in opposite directions.

In another form of the present invention the electrical controls thereof may act upon solenoid valve means for separately applying operating pressure to an air operated clutch and an air released brake, the brake having its own air operated motor.

In the drawings:

Fig. 1 is a fragmentary general elevational view of the upper portion of a punch press equipped with one form of the drive shaft control means of the present invention; and Fig. 2 is a wiring diagram showing schematically the electrical control circuits for the drive shaft of the punch press illustrated in Fig. 1.

Like characters of reference denote like parts, and, referring to Fig. 1, the numeral 10 designates one side frame of a punch press having a crown 11 and a drive shaft 12. The drive shaft is provided with one or more crank or eccentric portions for cooperating with a connection or connecting rod 13, which extends downwardly to a pivotal or universal joint connection with a press slide or ram or a shear crosshead, as the case may be.

In Fig. 1, the numeral 15 designates a flywheel or driving pulley which is freely rotatable on drive shaft 12, and the numerals 17 and 18 designate clutch and brake assemblies both of which are controlled by a fluid pressure conduit 19, which, in turn, is controlled by a solenoid valve designated 20 in Fig. 1. The details of this construction are shown in Letters Patent No. 2,428,337, referred to above, and need not be repeated here. As stated above, the clutch and brake shown by way of example are so designed and constructed that energization of the winding of solenoid valve 20 causes the clutch to be engaged and the brake to be released, and de-energization of the winding of solenoid valve 20 causes the clutch to disengage and the brake to become engaged.

In Fig. 2 the numeral 25 designates the winding of solenoid valve 20, and the numeral 26 designates the armature which is under the control of winding 25 to actuate the fluid valve element of solenoid valve 20.

Referring now to Fig. 2, a pair of alternating current supply wires are designated 30 and 31, and the former leads to a three position selector switch 32, which may be set for jogging or inching, for single revolution cycles which terminate automatically, or for continuous running. These three positions are marked, respectively, "Jog," "Run," and "Cont." in Fig. 2. When selector switch 32 is in the jog positon it connects supply wire 30 with a conductor 35, which leads to one side of solenoid valve winding 25, the other side of which is connected to supply wire 31. A pair of normally open, manually closable switches 36 and 37 are interposed in series in conductor 35.

When switch 32 is in the Run position it still connects supply wire 30 with conductor 35 and also with a conductor 38 which extends to one terminal of a normally open, manually closable switch 39. The other terminal of switch 39 is connected to one terminal of a further manually closable, normally open switch 40 by means of a conductor 41. The other terminal of switch 40 is connected back to the first terminal of switch 39 by a conductor 42, and the first-mentioned terminal of switch 40 has a conductor 43 leading therefrom. The foregoing arrangement results in conductors 38 and 43 being connected whenever either of switches 39 and 40 is closed or when both switches are closed.

As shown, switches 36 and 39 are arranged for joint manual closure, and switches 37 and 40 are likewise arranged for joint manual closure. A normally open limit switch 46 is disposed in a conductor 47, which connects between conductors 38 and 43 in parallel with switches 39 and 40. A second normally open limit switch 50 is disposed in a conductor 51 which connects between conductor 38 and a branch conductor 52, which connects with conductor 35 when the latter connects with one end of solenoid valve winding 25.

Conductor 35 is provided with a normally closed switch 55, conductor 51 contains a normally open switch 56, and a normally open switch 57 is interposed in conductor 43. The three switches 55, 56, and 57 have a common operating armature 58, which is shifted by a solenoid winding 59. One end of winding 59 connects with conductor 43 between switch 57 and conductor 47 by way of a conductor 60, and the other end of winding 59 leads back to line wire 31 by way of a conductor 61.

The remainder of the circuits appearing at the bottom of Fig. 2 are for controlling solenoid valve 20 during continuous running operation of the machine. Continuous running is employed, by way of example, when roll feeds, dial feeds, or other automatic feeding arrangements are used. A conductor 64 leads from line wire 30 to the same side of solenoid valve winding 25 as does conductor 35, in the diagram by way of conductor 52. Another conductor 65 leads from a contact 66 to the other supply wire 31, contact 66 being the continuous running contact of selector switch 32.

Conductors 64 and 65 contain normally open switches 68 and 69, respectively, which have a common operating armature 70 and a solenoid winding 71 therefor. Winding 71 is connected in series with switch 69 in conductor 65. A conductor 72 connects with conductor 65 in parallel with switch 69 and contains a normally open, manually closable switch 73 to start continuous running. Line wire 30 contains a cooperating, normally closed, manually operable switch 74 for stopping continuous running.

Referring to Fig. 1, a cam 80 is fixed for rotation with drive shaft 12, and a limit switch casing 81 is mounted upon a fixed portion of the machine with its operating member 82 engageable by the periphery of cam 80. Limit switch casing 81 contains the two pairs of normally open switch contacts designated 46 and 50 in Fig. 2, and cam 80 and switch operator 82 are indicated schematically in the wiring diagram, Fig. 2.

The operation of the foregoing control circuits will now be described. When selector switch 32 is in the jog position illustrated in Fig. 2, the only circuit subject to manual control is the one from line wire 30 through switch 32 and conductor 35 to the winding 25 and thence to the other line wire 31. For reasons of safety, the operating buttons of switches 36 and 37 are spaced, usually on the opposite side frame members of the machine, so that an operator must use both hands to simultaneously depress both buttons to close both of the switches 36 and 37 to energize winding 25 and supply operating air pressure to the clutch-brake mechanism, 17, 18. As soon as the operator releases either of the buttons of the switches 36 and 37, winding 25 is de-energized, clutch 17 automatically disengages, and brake 18 engages to quickly arrest drive shaft 12 at any desired position.

When the press or similar machine is to be used for cyclical operation, that is where the machine is to complete a full rotation of drive shaft 12 and then stop at an automatically predetermined position even though the operator continues to depress the manual operating buttons, selector switch 32 is set to the position marked "Run" in Fig. 2. It will be noted that this continues the electrical connection of switch 32 with conductor 35 and also connects line wire 30 with the selector switch contact for conductor 38.

With the selector switch in this position an initial brief closing of the switches 36, 37, 39, and 40 by operation of the spaced manual buttons will operate in the same way as in the jog position, energizing winding 25 through conductor 35. That is due to the fact that switch 57 is open and the connection of conductor 38 through selector switch 32 and switches 39 and 40 is of no effect.

It will be noted that cam 80 has a low portion extending for a predetermined arcuate distance, in the present instance approximately 120°, followed by a higher portion throughout the remainder of its periphery. The higher portion is provided to close switches 46 and 50, which are normally open limit switch contacts. If an operator continues to depress the spaced operating buttons and maintains switches 36, 37, 39, and 40 closed until the drive shaft of the machine has proceeded far enough through a cycle of operation to close switches 46 and 50 by means of cam 80, then a holding circuit is established by way of conductor 38 and the branch conductor leading therefrom to limit switch 46, thence through conductors 47 and 60, through winding 59, and thence by way of conductor 61 to the other side of the power supply.

This circuit energizes winding 59 and thus causes switches 56 and 57 to close and switch 55 to open. The continued energization of winding 25 is now by way of conductor 38, limit switch 50, conductor 51, switch 56, and thence by way of conductor 52 to one side of winding 25. Note that this circuit condition will be maintained regardless of whether one or both of the spaced buttons for operating switches 36, 37, 39 and 40 are held closed or not during the remaining single revolution cycle which is completed with limit switches 46 and 50 held closed by operation of cam 80 until the end of a complete rotation of cam 80.

Also, the circuit arrangement is such that another single revolution cycle of operation cannot be initiated until both of the spaced manual buttons of switches 36, 37, 39, and 40 have been released, and both buttons must be released at the end of the cycle before a new cycle can be commenced. Thus, continuous running cannot be attained by merely "staking" or tying down one or both of the manual operating buttons.

If either of the manual operating buttons is depressed at the end of a cycle, the machine will stop and cannot be operated to begin another cycle until both buttons are released. Assume that either of switches 39 or 40 is closed when limit switch 50 opens to terminate an operating cycle through operation of cam 80. The winding 59 will continue to be energized through either switch 39 or 40 and switch 57. Therefore, switch 55 will remain open until both switches 39 and 40 are open to de-energize winding 59, whereupon a new cycle can be started through switches 36 and 37.

In other words, with the selector switch 32 in the run position, the first approximately 120° of rotation can only be accomplished with winding 25 energized through switches 36 and 37, while the succeeding portion of the operating cycle can only be accomplished with winding 25 energized through conductor 38, limit switch 50, and switch 56.

When selector switch 32 is placed in the position for continuous running marked "Cont." in Fig. 2, line wire 30 is connected to contact 66, and the machine is conditioned to run continuously upon momentary manual actuation of start button 73 until stopped by operation of manual stop button 74. If start button 73 is depressed with the selector switch in contact with contact 66, winding 71 is energized by that part of conductor 65 which extends between contact 66 and winding 71 and thence by way of conductor 72 and again through conductor 65 to the other line wire 31.

This energization closes switches 68 and 69. Closure of switch 68 energizes winding 25 by way of conductors 64 and 52 to start the machine in operation, and simultaneous closure of switch 69 establishes a holding energizing circuit for winding 71 which is in parallel with respect to start button 73, so that both switches 68 and 69 will remain closed, and the machine will continue running even though start button 73 is immediately released.

When normally closed stop button 74 is manually operated it interrupts conductors 64 and 65, thus immediately de-energizing the solenoid valve winding 25 and the holding circuit winding 71.

It will be noted that in all of the various operating positions of selector switch 32 no current flows in the control windings during the idle periods between cyclic strokes of the press, between jogging movements, or between periods of continuous running movement.

The selector switch 32 may be key-operated so that only an authorized supervisor can determine its position. This will most commonly be availed of to assure that a press operator can use the machine only in the run position, although the selection by the supervisor may vary under different conditions. In the alternative, selector switch 32 may be merely manually operated and located in a control box, which may contain the various operating relays, and which, itself, may be locked against unauthorized entry.

What is claimed is:

1. In a control for a cyclically operable device having drive means, an electromagnet energizable to activate said drive means, an energizing circuit for said electromagnet, a pair of switches connected in series in said circuit, a pair of spaced control elements manually movable to close said switches and energize said electromagnet, electromotive means and energizing circuit means therefor, a second pair of switches closable simultaneously with the first pair by manual movement of said control elements and connected in parallel with each other in said electromotive circuit means, a normally closed switch in said electromagnet circuit and a normally open switch in said electromotive circuit means, said last two switches being movable by energization of said electromotive means to open and closed position, respectively, a second normally open switch in series with said electromotive means and in shunt with respect to said first normally open switch and said second pair of switches, and means operable by the drive means during its cycle to close said second normally open switch until the end of the machine cycle to energize said electromotive means, said first normally open switch being operative when closed to prevent institution of a succeeding drive means cycle through said first pair of switches until both of the manual control elements are released after the end of a drive means cycle to prevent continued energization of the electromotive means through either of the second pair of switches and the first normally open switch after said second normally open switch has opened upon the drive means reaching the end of a cycle of operation.

2. In a cyclic drive means control for machines, an electromagnet energizable to activate said drive means, an energizing circuit for said electromagnet, switch means connected in series in said circuit, control means manually movable to close said switch means and energize said electromagnet, electromotive means and energizing circuit means therefor, second switch means closable simultaneously with the first switch means by manual movement of said control means and connected in said electromotive circuit means, a normally closed switch in said electromagnet circuit and a normally open switch in said electromotive circuit means, said last two switches being movable by energization of said electromotive means to open and closed position, respectively, a second normally open switch in series with said electromotive means and in shunt with respect to said first normally open switch and said second switch means, and means operable by the machine during its cycle to close said second normally open switch until the end of the machine cycle to energize said electromotive means, said first normally open switch being operative when closed to prevent institution of a succeeding machine cycle through said first switch means until the manual control means is released after the end of a machine cycle to prevent continued energization of the electromotive means through the second switch means and the first normally open switch after said second normally open switch has opened upon the machine reaching the end of a cycle of operation.

3. In a cyclic drive means control for machines, an electromagnet energizable to activate said drive means, an energizing circuit for said electromagnet, a pair of switches connected in series in said circuit, a pair of spaced control elements manually movable to close said switches and energize said electromagnet, electromotive means and energizing circuit means therefor, a second pair of switches closable simultaneously with the first pair by manual movement of the control elements and connected in parallel in said electromotive circuit means, a normally closed switch in said electromagnet circuit and a normally open switch in said electromotive circuit means, said last two switches being movable by energization of said electromotive means to open and closed position, respectively, a second normally open switch in series with said electromotive means and in shunt with respect to said first normally open switch and said second pair of switches, and means operable by the machine during its cycle to close said second normally open switch until the end of the machine cycle to energize said electromotive means, said first normally open switch being operative when closed to prevent institution of a succeeding machine cycle through said first pair of switches until both of the manual control elements are released after the end of a machine cycle to prevent continued energization of the electromotive means through either of the second pair of switches and the first normally open switch after said second normally open switch has opened upon the machine reaching the end of a cycle of operation, and third and fourth normally open switches in series with said electromagnet and in parallel with said first pair of switches and said normally closed switch, said third normally open switch being closable with the second normally open switch by the machine during and until the end of a machine cycle whereby an operating cycle is completed automatically despite the release of the manual control elements during a machine cycle, and said fourth switch being closable by said electromotive means.

4. In a cyclic drive means control for machines, an electromagnet energizable to activate said drive means, an energizing circuit for said electromagnet, switch means connected in series in said circuit, control means manually movable to close said switch means and energize said electromagnet, electromotive means and energizing circuit means therefor, second switch means closable simultaneously with the first switch means by manual movement of said control means and connected in said electromotive circuit means, a normally closed switch in said electromagnet circuit and a normally open switch in said electromotive circuit means, said last two switches being movable by energization of said electromotive means to open and closed position, respectively, a second normally open switch in series with said electromotive means and in shunt with respect to said first normally open switch and said second switch means, and means operable by the machine during its cycle to close said second normally open switch until the end of the machine cycle to energize said electromotive means, said first normally open switch being operative when closed to prevent institution of a succeeding machine cycle through said first switch means until the manual control means is released after the end of a machine cycle to prevent continued energization of the electromotive means through the second switch means, and the first normally open switch after said second normally open switch has opened upon the machine reaching the end of a cycle of operation, and a third normally open switch in series with said electromagnet and in parallel with said first switch means, said third normally open switch being closable with the second normally open switch by the machine during and until the end of a machine cycle whereby an operating cycle is completed automatically despite the release of the manual control means during a machine cycle.

5. In a cyclic drive control for machines, an electromagnet energizable to render said drive means operative, an energizing circuit for said electromagnet, a pair of switches connected in series in said circuit, a pair of spaced control elements manually movable to close said switches and energize said electromagnet, electromotive means and energizing circuit means therefor, a second pair of switches closable simultaneously with the first pair by manual movement of the control elements and connected in parallel in said electromotive circuit means, a normally closed switch in said electromagnet circuit and a normally open switch in said electromotive circuit means, said last two switches being movable by energization of said electromotive means to open and closed position, respectively, a second normally open switch in series with said electromotive means and in shunt with respect to said first normally open switch and means operable during the machine cycle to close said second normally open switch to energize said electromotive means and establish a holding circuit therefor through said first normally open switch and either of said second pair of switches to insure de-energization of the electromagnet through opening of the normally closed switch in its circuit at the end of a machine cycle.

REEVE W. DEAN.

References Cited in the file of this patent

UNITED STATES PATENTS

| Number | Name | Date |
|---|---|---|
| 2,210,886 | Dewey | Aug. 13, 1940 |
| 2,299,007 | Bundy | Oct. 13, 1942 |
| 2,302,838 | Bundy | Nov. 24, 1942 |
| 2,404,980 | Munschauer | July 30, 1946 |
| 2,404,982 | Owens et al. | July 30, 1946 |
| 2,471,505 | Winther | May 31, 1949 |